July 3, 1956    R. D. TOMLIN    2,752,894
DIFFERENTIAL FLUID PRESSURE MOTORS
Filed Feb. 7, 1951    2 Sheets-Sheet 1
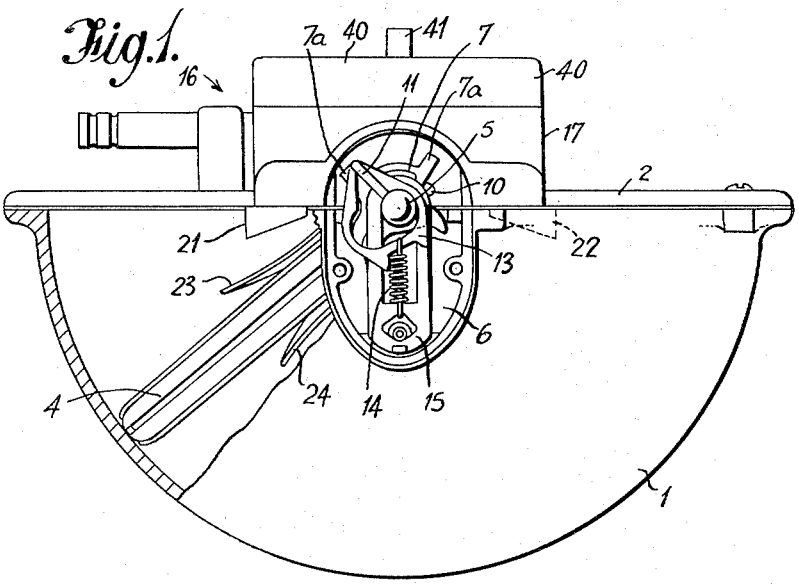
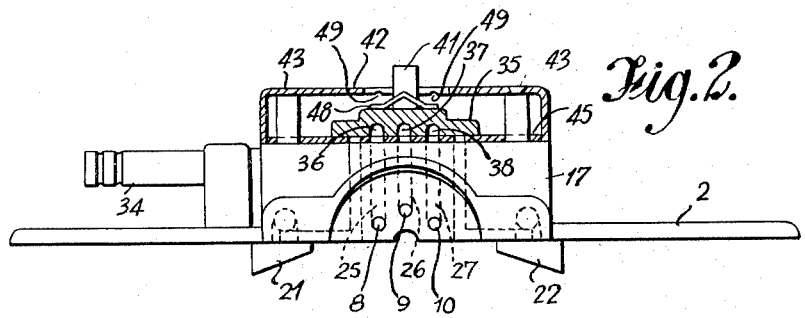
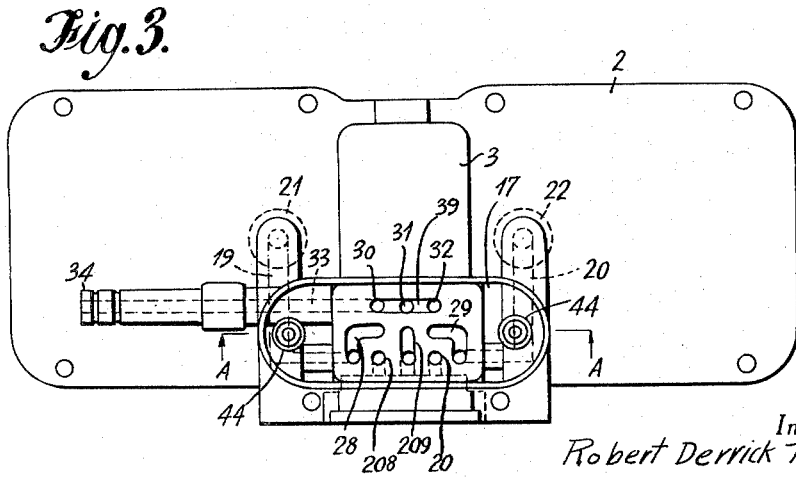
Inventor
Robert Derrick Tomlin
By O'Boyle + Blair
Attorneys July 3, 1956   R. D. TOMLIN   2,752,894
DIFFERENTIAL FLUID PRESSURE MOTORS
Filed Feb. 7, 1951   2 Sheets-Sheet 2
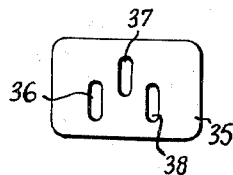
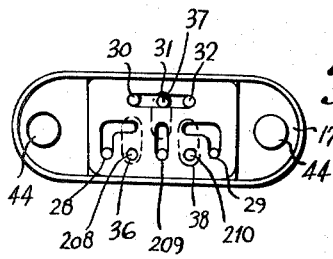
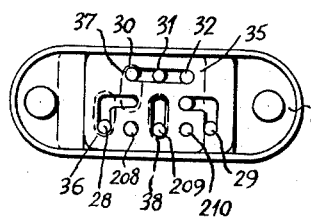
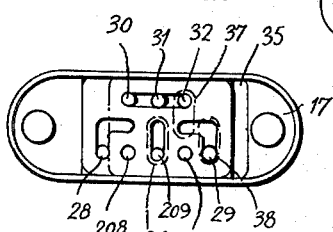
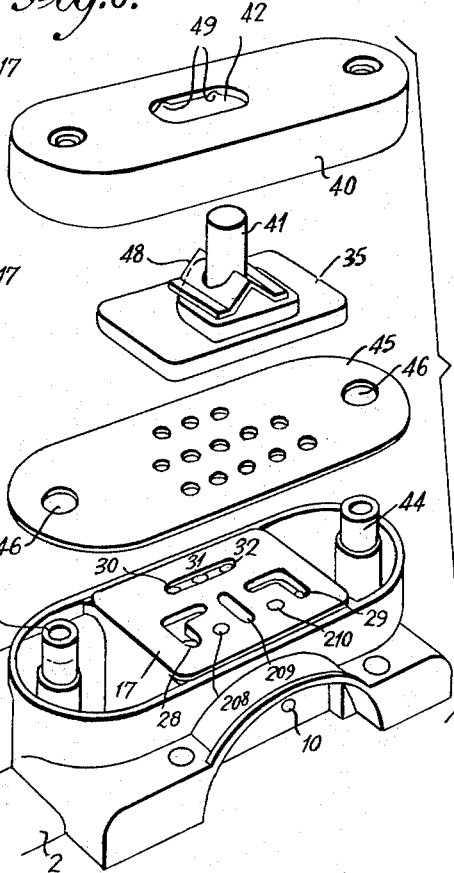
Inventor
Robert Derrick Tomlin
By O'Boyle + Blair
Attorneys United States Patent Office 2,752,894
Patented July 3, 1956

2,752,894

DIFFERENTIAL FLUID PRESSURE MOTORS

Robert Derrick Tomlin, Harlington, England, assignor to Magnatex Limited, Harlington, England, a British company Application February 7, 1951, Serial No. 209,822

Claims priority, application Great Britain February 9, 1950

10 Claims. (Cl. 121—97)

The present invention relates to differential fluid pressure motors, and more particularly to suction-operated motors as used for driving windscreen wipers.

It is the general practice with such motors to arrange for the piston or paddle to move, when the motor is stopped, to a limiting position at one end of its range of movement, so that the wiper blade will be parked at or beyond the limit of its arc of wiping. Often the piston or paddle is moved a short distance beyond one end of its normal stroke or arc of movement, so that the wiper blade will be parked outside its normal arc of wiping. This is effected by constructing the manual control valve for the motor so that when it is moved to its "off" position the source of suction is disconnected from the automatic valve mechanism and is directly connected to one side of the piston or paddle. When in its limiting or parked position, a closure valve carried by the paddle or piston fits against a cup seating surrounding the aperture through which suction is applied, thereby preventing the suction from continuously acting on the piston or paddle packings during parking.

In some wiper installations it is necessary for the wiper to park on the right-hand side and in others on the left-hand side, and this necessitates special motor constructions for each application.

The present invention has for an object to provide a differential fluid pressure motor of which the piston or paddle can be parked at either one side or the other, at will.

From one aspect, the present invention consists in a suction motor wherein the piston or paddle movable in the motor chamber carries sealing or closure members on opposite sides thereof which are adapted respectively to engage with two valve seatings in the chamber when the piston or paddle is in one or the other of its extreme limiting positions of travel, and wherein suction is applied to opposite sides of the piston or paddle through two passages connected respectively with said valve seatings so that the passages will be sealed off from the chamber when the corresponding valve seating is engaged by its associated sealing or closure member, means being provided for selectively connecting said passages to a source of suction.

The supply of suction through said passages is controlled, whilst the motor is running, by the operation of an automatic valve and, according to a feature of this invention, control valve means are provided for selectively connecting either one or other of these passages directly to the source of suction and simultaneously venting the other passage whereby the piston or paddle will be moved towards the valve seating to which the suction is directly applied and will be parked at the corresponding end of the motor when that valve seating is engaged and sealed off by the associated sealing or closure member carried by the piston or paddle.

The control valve means is preferably constituted by a single control valve which is selectively movable from an "ON" position in which the motor runs normally to either of two "OFF" positions for parking the piston or paddle at either one side or the other of the motor. The control valve may be arranged so that it may be moved to either of the "OFF" positions or, if desired, stop means may be provided for restricting the movement of the valve to only one of the "OFF" positions, the stop means being adjustable to select the "OFF" position to which the control valve may be moved. Alternatively, the motor may be constructed so that the control valve itself has to be adjusted or replaced by another control valve for selectively parking the piston or paddle at either one end or the other of its travel.

From another aspect the present invention consists in a differential fluid pressure motor having valve mechanism automatically actuated by the movement of the motor piston or paddle to connect a fluid pressure or suction inlet port alternately with one or other of two outlet ports for feeding the fluid pressure or suction alternately to opposite sides of the motor and thereby cause the piston or paddle to reciprocate, such outlet ports each leading to separate ports in a valve seating associated with a control valve, said control valve seating also having two further ports connecting respectively with opposite sides of the motor, a port connecting with the inlet port of the automatic valve mechanism and a port adapted to be connected to the source of fluid pressure or suction, said control valve being movable from an "ON" position in which it connects the fluid supply port to the port leading to the inlet port of the automatic valve mechanism, and the ports connected with the outlet ports of the automatic valve mechanism respectively to the ports leading to opposite ends of the motor, to an "OFF" position in which the fluid supply port is disconnected from the inlet port of the automatic valve mechanism and is connected to one of the ports leading to one side of the motor, the port leading to the other side of the motor being then vented to atmosphere.

By constructing the motor so that the passages from both the outlet ports of the automatic valve mechanism are connected to their corresponding sides of the motor through the control valve, it becomes a simple matter by adjusting the control valve to connect the source of differential fluid pressure, when the control valve is in the "OFF" position, to either one side or the other of the motor and thereby cause the piston or paddle to park at either one end or the other of the motor. This may be achieved by interchanging the control valve with another control valve having different connections or by suitable location of the port positions in the control valve seating and the controlling ports or passages in the control valve, whereby the selection of the parking position may be effected by simply reversing the position of the control valve on the control valve seating.

Preferably, however, the control valve is arranged to be movable to three positions relative to the control valve seating, one of which is the "ON" position and the others of which are two "OFF" positions in which the piston or paddle will be parked respectively at opposite ends of the motor. Preferably an adjustable or interchangeable stop is provided which is adapted to restrict the movement of the control valve to only two positions, viz. the "ON" position and one of the "OFF" positions, the adjustment or interchanging of the stop selecting either one or other of the "OFF" positions to which the control valve can be moved and thus the position in which the motor will park.

The passages leading from the ports on the control valve seating to the opposite ends of the motor preferably connect with the motor casing within the sealing-off cups, the piston or paddle carrying sealing or closure members on both sides so that suction will not be applied directly to the piston or paddle packings when the motor is parked, irrespective of the end in which it is parked.

In order that the invention may be more clearly understood, reference will now be made to the accompanying drawings in which:

Fig. 1 shows a side view of a suction motor of the oscillating paddle type according to the invention, partly in section and with the cover of the automatic valve chamber removed, Fig. 2 is a side view of the motor cover, with the control valve and its cover shown in section, Fig. 3 is a plan view of Fig. 2 with the control valve and its cover removed to show the arrangement of the parts in the control valve seating, Fig. 4 is a view of the underside of part of the control valve, Figs. 5, 6 and 7 are diagrammatic plan views of the control valve in different positions, Fig. 8 is an exploded view of the components of the control valve and its seating.

Referring to the drawings, the motor has a casing comprising a body section 1 fitted with a cover section 2, sealed thereto by a gasket forming a sealed arcuate piston chamber in which a vane or paddle type of piston 4 secured to a shaft 5 is adapted to oscillate in an arcuate manner about the axis of the shaft so as to rock the latter. The upper end of the paddle moves, in known manner, in an auxiliary arcuate chamber 3 formed in the cover 2. One end of the shaft 5 is adapted to be connected to drive a windscreen wiper arm (not shown) and the other end of the arm extends into a valve chamber 6 and is adapted to operate automatic valve mechanism for alternately connecting a source of suction to opposite sides of the paddle and thereby cause the latter to oscillate. The valve chamber is provided with a cover which has been omitted from the drawing in order to show the valve mechanism.

The valve mechanism comprises a semi-rotary valve 7 movable over a valve face provided with three ports 8, 9 and 10, (Fig. 2), the valve being moved with a snap action by the over-centre movement of a kicker 11 which is moved in known manner by engaging with radial surfaces formed at the end of the rocker shaft 5. The kicker 11 is associated with a stirrup 13 connected by a spring 14 to a pressure plate 15. The spring 14 serves the dual purpose of snapping over the kicker immediately it passes its dead-centre position, whereby the kicker snaps over the valve 7 by engaging with one or other of the ears 7a thereof, and also of causing the pressure plate to apply a light pressure to hold the valve 7 against the valve face. As so far described the motor is of conventional and well-known design and further description thereof and of the mode of operation of the valve mechanism is unnecessary.

The control valve, indicated generally by reference 16 in Fig. 1, is associated with the automatic valve through a common valve block 17 in the front face of which are formed the ports 8, 9 and 10. The control valve serves, as will hereinafter appear, to apply suction to the central port 9 and to connect the outer ports 8 and 10 through passages 19 and 20 respectively in the cover 2 to the motor chamber at opposite sides of the paddle. The passages 19 and 20 terminate respectively within cup-shaped valve seatings 21 and 22 carried from the underside of the cover.

Carried on opposite sides of the paddle 2 are two sealing members 23 and 24, which may comprise flexible or pad-like members which are adapted to fit over the valve seatings 21 and 22 respectively when the paddle is in either one or the other of its extreme limiting positions of movement. The edges of the cups 21, 22 are inclined, as shown, in order that the sealing members may fit flat against the valve seatings. When the sealing member is fitting against its associated valve seating and suction is applied thereto, the sealing member is sucked against the valve seating, thereby holding the paddle in its limiting position while sealing off the suction from the motor chamber in order that the suction may not be continuously acting on the paddle packings whilst the motor is "parked." By the provision of sealing members on both sides of the paddle and the provision of two valve seatings 21, 22 at opposite limiting positions of movement of the paddle, the latter may be "parked" at either end of its travel, at will, by simply maintaining the suction on that end of the motor at which the paddle is to be parked instead of allowing the automatic valve 7 to change over the suction connection to the opposite side of the paddle. This is achieved by moving the control valve to a position in which it connects the suction to the appropriate side of the motor instead of to the automatic valve 7 as now to be described.

The top of the valve block 17 is formed with a valve face in which are provided ports 208, 209 and 210 communicating respectively with ports 8, 9 and 10 of the automatic valve through passages 25, 26 and 27 respectively in the block 17. Also formed in the valve face are two L-shaped ports 28 and 29 communicating respectively with passages 19 and 20. Port 209 is elongated to reach a position of alignment with the opposed limbs of the L-shaped ports 28 and 29. Three ports 30, 31 and 32 are formed in the valve face in a line parallel to the aligned ports 208, 209 and 210 and communicating with a common passage 33 leading to a nipple 34 by means of which the motor can be connected to a source of suction, such as the intake manifold of an internal combustion engine. The ports are also interconnected at the valve face by an elongated channel 39.

Co-operating with the valve face is a slidable valve member 35 (Figs. 4 and 8) having on its under face three elongated channels 36, 37 and 38 arranged to connect together the ports 31 and 209; 28 and 208; and 29 and 210 in its "ON" or central position as indicated in Fig. 5. In this position of the control valve, suction is applied via ports 31 and 209 and channel 26 to the central port 9 of the automatic valve by which it is applied alternately to ports 8 and 10 and via passages 25 and 27 respectively and ports 208 and 210, ports 28 and 29, and channels 19 and 20 to the cups 21 and 22.

If the valve member 35 is now moved to the left as shown in Fig. 6, port 29 is isolated from the suction port 31, but port 28 leading to cup 21 is now connected to suction port 30 via the channel 37 in valve member 35 and the motor is brought to rest in a "parking" position with the paddle held firmly against cup 21 by suction. In this position of the control valve, channels 36 and 38 become ineffective. Port 29 leading to suction cup 22 is uncovered by the valve member 35 and is thereby vented to atmosphere as although the control valve is provided with a cover 40 (Figs. 1 and 8), this is not air-tight. The valve member 35 and the channels 36, 37 and 38 are shown in broken lines in Figs 5, 6 and 7 and the said channels are shown larger than the channels in the valve face for the sake of clarity.

If the valve member is moved to its extreme right hand position shown in Fig. 7, the connections are reversed and port 28 and suction cup 21 are vented to atmosphere and port 29 is connected to the source of suction so that the motor is brought to rest in a "parked" position with the paddle at the opposite end of the arcuate chamber and held against the suction cup 22.

With the mechanism so far described, the motor may be "parked" at one or the other of its limit positions by the appropriate positioning of the control valve 35 through the intermediary of a peg 41 projecting through a slot 42 in the cover 40. The peg 41 may be adapted for direct manual operation or through the intermediary of a remote control, such as a Bowden cable.

The slot 42 may, as shown in Figure 2, be of sufficient length to enable the valve to be moved to either of its three positions. The valve may be located in either of its three operative positions by means of a leaf spring 48 carried by the valve and surrounding the peg 41, the spring being bent to form an angle at its top which locates in notches 49 formed on the underside of the cover 40. This arrangement not only enables the wiper to be parked at will at either one end or the other of its extreme limits of travel, but also enables the wiper blade, when being used during a snow storm, to be moved beyond its normal arc of movement to assist in removing any snow which may tend to pack at the ends of the normal arc of movement of the blade.

Alternatively, the slot 42 may be of such a length as to enable the peg 41 to be moved between only two positions of the control valve, the slot being arranged asymmetrically in the cover 40 as shown in Fig. 8, so that the movement of the valve 35 is limited between the central "ON" position and one "parking" position. The cover is detachably secured in position by countersunk screws 43 screwed into supporting posts 44 on the control valve. By releasing the cover 40 and reversing its position end to end, the slot 42 may be brought to the opposite side of the central position so as to condition the motor for parking on the opposite side.

Fig. 8 shows a gasket 45 interposed between the valve block 17 and the valve member 35. The gasket is perforated at 46 to accommodate the posts 44 and is perforated at 47 in conformity with the porting of the valve face of valve block 17. This improves the fluid seal at the valve face but does not affect the principle of operation of members 35 and 17 as above described.

Whilst a particular embodiment has been described, it will be understood that various modifications may be made without departing from the scope of the invention. Instead of the pin and slot arrangement, any other form of adjustable or removable stop or stops may be provided so as to prevent the valve from moving beyond its central or "ON" position in one direction and beyond an "OFF" position in the other direction. Thus the stop may comprise a screw which can be located in either of two positions so that, by simply moving the position of the screw, the motor may be adjusted for parking to either one side or the other. Further, the control valve, instead of being of the slide type, may be of the rotary or semi-rotary type. The control valve may be either manually operated or by a servo mechanism from a remote point.

I claim:

1. A differential fluid pressure motor comprising a casing consisting of an arcuate chamber and a cover therefor, an output shaft disposed along the geometric axis of said arcuate chamber, a paddle type piston fixed to the shaft and movable in said arcuate chamber, fluid flow means on the casing connectible to a source of fluid pressure other than atmospheric pressure, said casing having a fluid passage leading to said fluid flow means and fluid passages leading to opposite ends of said arcuate chamber, an automatic valve actuated by the movement of the piston to connect said first mentioned passage alternately to said second mentioned passages, and a control valve controlling all said passages and movable from an intermediate position in which all said passages are connected to said automatic valve, to limit positions on opposite sides of said intermediate position and in which said automatic valve is isolated from said first mentioned passage and said second mentioned passages and said first mentioned passage is selectively connected to one or the other of said second mentioned passages, according to which limit position is selected, and the passage not so connected is vented to atmosphere.

2. A differential fluid pressure motor as claimed in claim 1, comprising also a stop for limiting the movement of the control valve to movement between said intermediate position and one of said limit positions, said stop being alterable to limit the movement of the control valve to movement between said intermediate position and the other of said limit positions.

3. A differential fluid pressure motor comprising a chamber, a piston movable therein, an automatic valve mechanism provided with an inlet port and two outlet ports, and automatically actuated by the movement of the motor piston to connect said inlet port alternately with one or other of said two outlet ports, a control valve, and a valve seating therefor, said valve seating having two ports leading respectively to said outlet ports from said automatic valve mechanism and also having two further ports connecting respectively with the chamber at opposite sides of the motor piston, a fifth port connecting with the inlet port of the automatic valve mechanism and a fluid supply port adapted to be connected to a source of fluid at pressure other than atmospheric pressure, a vent to atmosphere from said control valve, and said control valve being movable from an "on" position in which it connects the fluid supply port to the fifth port leading to the inlet port of the automatic valve mechanism, and the ports connected with the outlet ports of the automatic valve mechanism respectively to the ports leading to opposite sides of the motor piston, to an "off" position in which the fluid supply port is disconnected from the fifth port leading to the inlet port of the automatic valve mechanism and is connected to one of the ports leading to one side of the motor piston, and the port leading to the other side of the motor piston is connected to the vent to atmosphere, and in which position said automatic valve mechanism is isolated from the fluid supply port and the ports connected respectively with the chamber at opposite sides of the motor piston by the inlet ports and outlet ports of said automatic valve mechanism being sealed off by said control valve.

4. A differential fluid pressure motor as claimed in claim 3, comprising also a stop for limiting the movement of the control valve to movement between said "on" position and one of said "off" positions, said stop being alterable to limit the movement of the control valve to movement between said "on" position and the other of said "off" positions.

5. A differential fluid pressure motor as claimed in claim 3, comprising also a cover for the control valve, said cover having a slot therein, and a projection on the control valve movable in the slot to limit the movement of said control valve between said "on" position and one of said "off" positions, said cover being detachable and reversible end to end, and said slot being asymmetrically disposed therein, whereby the limited movement of the valve can be changed to movement between said "on" position and the other of said "off" position by reversing said cover end to end.

6. A suction motor comprising a casing consisting of an arcuate chamber and a cover therefor, an output shaft disposed along the geometric axis of said arcuate chamber, a paddle type piston fixed to the shaft and movable in said arcuate chamber, fluid flow means on the casing connectible to a source of fluid suction, said casing having a fluid passage leading to said fluid flow means and fluid passages leading to opposite ends of said arcuate chamber, a sealing-off cup at each end of the arcuate chamber and communicating with the fluid passage leading thereto, closure members for the cups on opposite sides of the piston, an automatic valve actuated by the movement of the piston to connect said first mentioned passage alternately to said second mentioned passages, and a control valve controlling all said passages and movable from an intermediate position in which all said passages are connected to said automatic valve, to limit positions on opposite sides of said intermediate position and in which said automatic valve is isolated from said first mentioned passage and said second mentioned passages and said first mentioned passage is selectively connected to one or the other of said second mentioned passages according to which limit position is selected and the passage not so connected is vented to atmosphere.

7. A differential fluid pressure motor comprising a chamber, a piston movable in said chamber, an automatic valve actuated by the motor piston to connect opposite ends of the motor chamber alternately to fluid flow means connectible to a source of fluid pressure other than atmospheric pressure, a control valve and a valve seating therefor, said valve seating having a first line of ports consisting of three aligned ports leading to said automatic valve and a port at each end of said aligned ports and leading to the corresponding end of the motor, and a second line of ports parallel to the first and consisting of three aligned ports leading to said fluid flow means, means for sliding said control valve over said valve seating in the direction of alignment of the ports, said control valve having channels in the face thereof co-operating with the ports in the valve seating to connect together the middle ports of the two lines of ports and to connect together the two outer ports at each end of said first line of ports in the middle position of the control valve, and to disconnect said middle ports and seal-off said ports to said automatic valve and connect together the ports at one end of the two lines of ports in each of two limit positions of the control valve on opposite sides of the middle position.

8. A suction motor comprising a chamber, a piston movable in said chamber, an automatic valve mechanism provided with an inlet port and two outlet ports and automatically actuated by the movement of the motor piston to connect said inlet port alternately with said two outlet ports, a control valve, and a valve seating therefore, said valve seating having two ports leading respectively to said outlet ports from said automatic valve mechanism and also having two further ports connecting respectively with sealing-off cups at opposite ends of the motor chamber, a fifth port connecting with the inlet port of the automatic valve mechanism and a suction supply port adapted to be connected to a source of suction, a vent to atmosphere from said control valve, and said control valve being movable from an "on" position in which it connects the suction supply port to the fifth port leading to the inlet port of the automatic valve mechanism, and the ports connected with the outlet ports of the automatic valve mechanism respectively to the ports leading to the sealing-off cups at opposite ends of the motor chamber, to an "off" position in which the suction supply port is disconnected from the fifth port leading to the inlet port of the automatic valve mechanism and is connected to one of the ports leading to the sealing-off cup at one end of the chamber, and the port leading to the sealing-off cup at the other end of the chamber is connected to the vent to atmosphere, and in which position said automatic valve mechanism is isolated from the fluid supply port and the ports connected respectively to the sealing-off cups at opposite ends of the motor chamber by the inlet port and outlet ports of said automatic valve mechanism being sealed-off by said control valve.

9. A differential fluid pressure motor having a valve mechanism automatically actuated by the movement of the motor piston to connect a source of suction alternately to opposite sides of the motor to reciprocate the piston, wherein passages leading from the automatic valve to opposite sides of the motor pass through a common control valve through which also passes a passage leading to the automatic valve from a member adapted to be connected to the source of suction, said control valve being movable from an intermediate position, in which all three passages are connected to the automatic valve, to limit positions on opposite sides of the intermediate position and in which the automatic valve is isolated and said last mentioned passage is selectively connected to one of said first mentioned passages, according to the limit position selected, and the passage not so connected is vented to atmosphere, and a stop for limiting the movement of the control valve to movement between the intermediate position and either one of said limit positions and comprising a detachable cover for the control valve reversible end-to-end and provided with a slot, in combination with a projection on the control valve movable in the slot to limit the movement of the valve, said slot being disposed asymmetrically in the cover whereby the limited movement of the control valve can be changed by reversing said cover.

10. In a differential fluid pressure motor comprising a chamber, a piston movable in said chamber, and having an automatic valve actuated by the motor piston to connect opposite ends of the motor chamber alternatively to fluid flow means connectable to a source of fluid pressure other than atmospheric pressure, a control valve and a valve seating therefor, said valve seating having a first line of ports consisting of three aligned ports leading to said automatic valve and an L-shaped port at each end of said aligned ports arranged with a limb of each L-shaped port extending towards each other and in a direction parallel to said aligned ports, and said L-shaped ports leading respectively to the corresponding end of the motor, and an elongated slot extending parallel to and spaced from said aligned ports for the width of said aligned ports and leading to said fluid flow means, means for sliding said control valve over said valve seating in the direction of alignment of the ports, said control valve having three elongated channels in the face thereof transverse to the direction of said aligned ports and to the direction of sliding of said control valve and spaced by a distance corresponding to the distance between said three aligned ports, said elongated channels co-operating with the ports in the valve seating to connect together the middle port of said three aligned ports with said elongated slot and to connect together the two outer ports of said three aligned ports to the limbs of said L-shaped ports in the middle position of the control valve, and to disconnect said elongated slot and said middle port and to connect said elongated slot with one of said L-shaped ports respectively in each of two limit positions of the control valve on opposite sides of the middle position and additionally in each of said two limit positions to seal-off said three aligned ports leading to said automatic valve.

References Cited in the file of this patent

UNITED STATES PATENTS

| | | |
|---|---|---|
| 1,840,233 | Hueber | Jan. 5, 1932 |
| 2,348,492 | O'Shei | May 9, 1944 |
| 2,602,430 | Bell | July 8, 1952 |
| 2,696,805 | Krohm | Dec. 14, 1954 |
| 2,698,607 | Krohm | Jan. 4, 1955 |

FOREIGN PATENTS

| | | |
|---|---|---|
| 697,976 | France | Nov. 5, 1930 |